(12) United States Patent
Perie

(10) Patent No.: US 7,670,000 B2
(45) Date of Patent: Mar. 2, 2010

(54) EYEGLASSES OF THE RIMLESS TYPE WITH WIRE BRANCHES

(75) Inventor: Jean-Claude Perie, Montauban (FR)

(73) Assignee: Minima, Linas (FR)

( * ) Notice: Subject to any disclaimer, the term of this patent is extended or adjusted under 35 U.S.C. 154(b) by 0 days.

(21) Appl. No.: 12/257,443

(22) Filed: Oct. 24, 2008

(65) Prior Publication Data

US 2009/0109394 A1 Apr. 30, 2009

(30) Foreign Application Priority Data

Oct. 26, 2007 (FR) .................................. 07 07531

(51) Int. Cl.
*G02C 1/02* (2006.01)
(52) U.S. Cl. ...................... 351/110; 351/124
(58) Field of Classification Search ................. 351/110, 351/124, 140, 153, 111, 116, 41, 158; 16/228
See application file for complete search history.

(56) References Cited

U.S. PATENT DOCUMENTS

| | | | |
|---|---|---|---|
| 5,367,344 | A | 11/1994 | Fuchs |
| 5,585,870 | A | 12/1996 | Masunaga |
| 5,835,183 | A | 11/1998 | Murai et al. |
| 5,880,807 | A | 3/1999 | Devercelli |
| 5,903,332 | A | 5/1999 | Devercelli |
| 6,439,717 | B2 | 8/2002 | Weber |
| 6,447,117 | B1 | 9/2002 | Estrada et al. |
| 6,860,597 | B2 | 3/2005 | Carlon |
| 7,059,716 | B2 | 6/2006 | Spindelbalker |
| 7,073,903 | B2 | 7/2006 | Rapp |
| 7,249,844 | B2 * | 7/2007 | Sakai .......................... 351/110 |
| 7,264,348 | B2 | 9/2007 | Perie |
| 2001/0019395 | A1 | 9/2001 | Weber |
| 2004/0051843 | A1 | 3/2004 | Carlon |
| 2005/0041198 | A1 | 2/2005 | Rapp et al. |

FOREIGN PATENT DOCUMENTS

| | | |
|---|---|---|
| EP | 0814359 | 12/1997 |
| EP | 1107042 A | 6/2001 |

(Continued)

OTHER PUBLICATIONS

European Search Report for EP 08 29 0931 dated Dec. 3, 2008.

*Primary Examiner*—Hung X Dang
(74) *Attorney, Agent, or Firm*—McCormick, Paulding & Huber LLP

(57) ABSTRACT

The invention relates to eyeglasses of the rimless type comprising a bridge interconnecting the two eyeglass lenses, and two side branches of wire structure connected to respective side zones of the corresponding lenses, each side branch having a main portion together with a distal end extending said main portion and arranged to fasten to the side zone of the lens, said distal end being generally J-shaped. In accordance with the invention, each side branch is fitted with a hinge that is arranged so that the section and the profile of the side branch in its deployed position are generally continuous, thereby enabling it to pass through a through hole in the lens so as to enable said side branch to be put into place merely by being threaded, while in its deployed position, through the lens from its front face.

8 Claims, 6 Drawing Sheets

FOREIGN PATENT DOCUMENTS

| | | | |
|---|---|---|---|
| EP | 1382988 A | 1/2004 |
| FR | 1344445 A | 11/1963 |
| FR | 2862390 A1 | 5/2005 |
| GB | 721651 A | 1/1955 |
| JP | 2002318372 A | 10/2002 |
| WO | 9605535 A1 | 2/1996 |
| WO | 0026716 A | 5/2000 |
| WO | 0221193 A | 3/2002 |
| WO | 02095481 A | 11/2002 |
| WO | 02095482 A | 11/2002 |
| WO | 03014804 A | 2/2003 |
| WO | 03083553 | 10/2003 |
| WO | 2004003632 A | 1/2004 |

\* cited by examiner

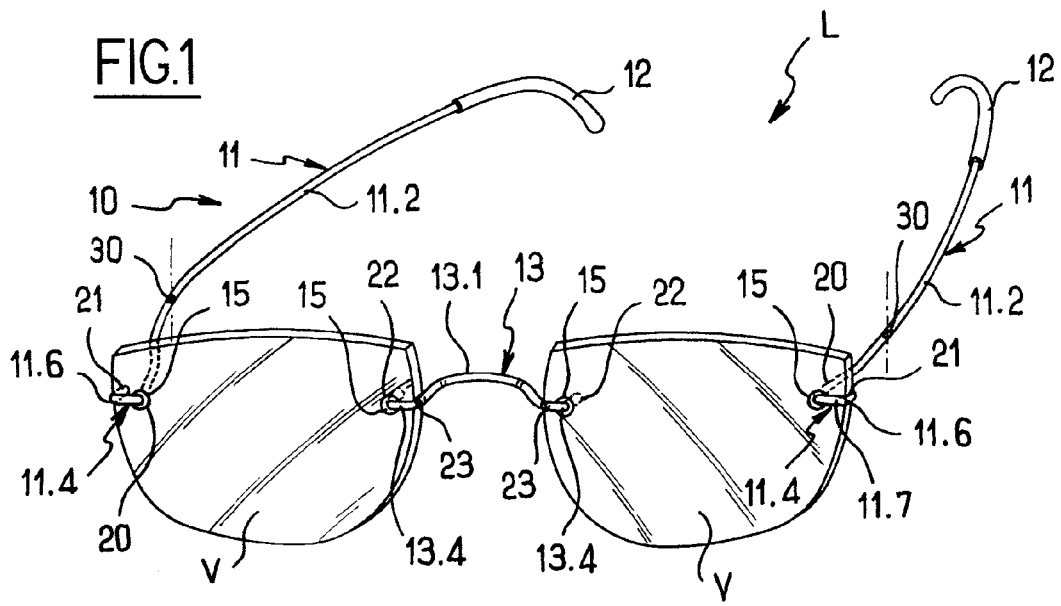
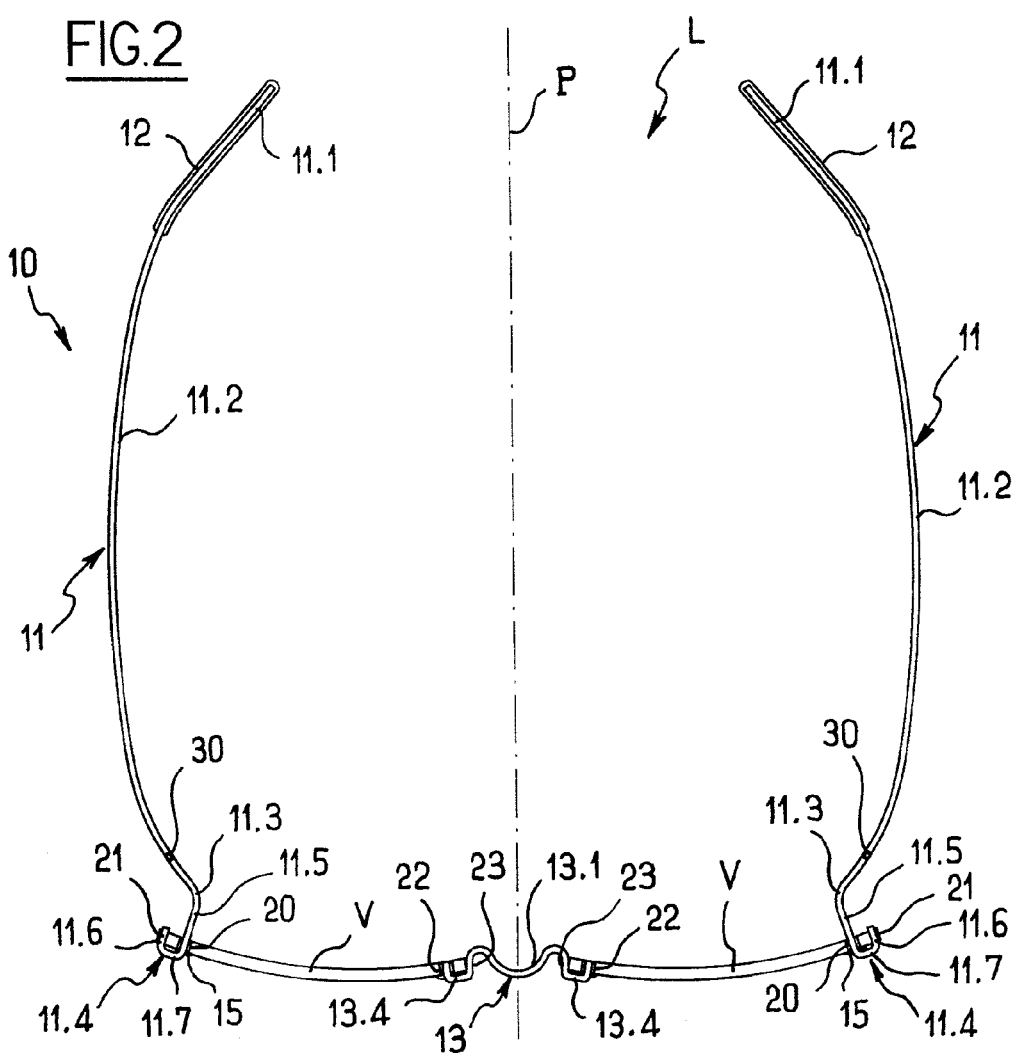

FIG.3
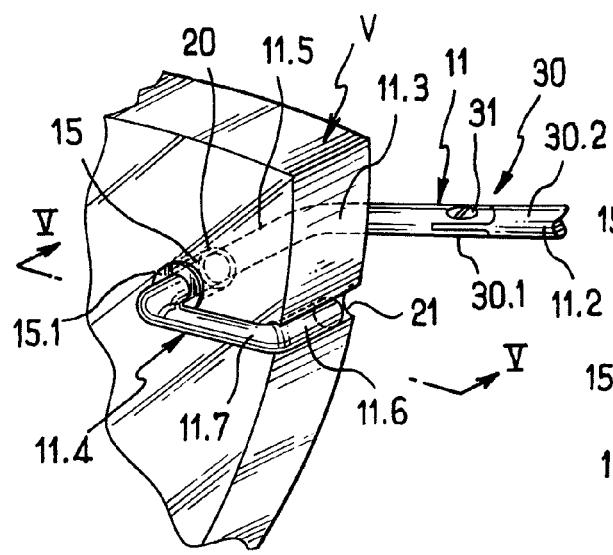
FIG.4
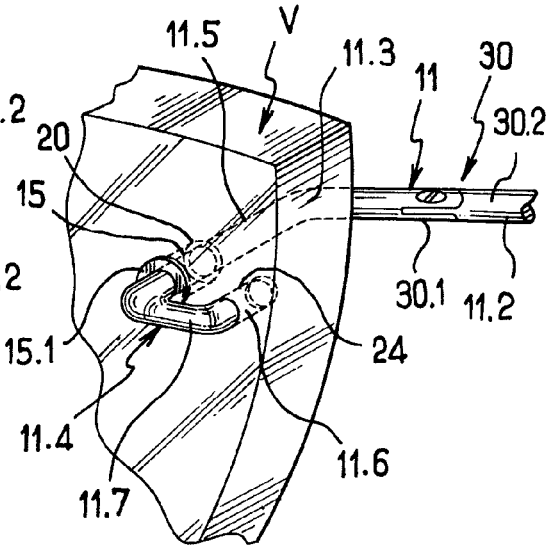
FIG.5
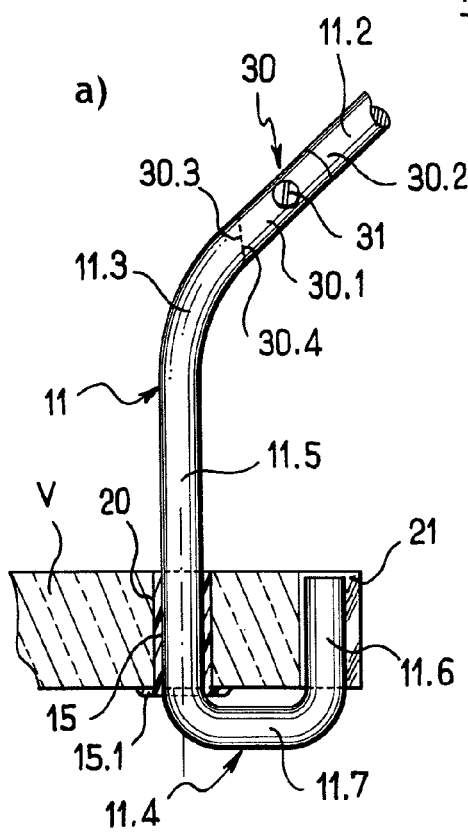
a)
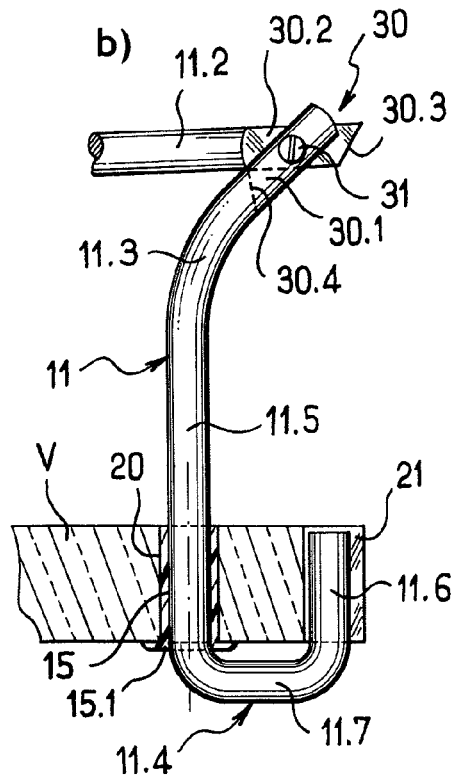
b)

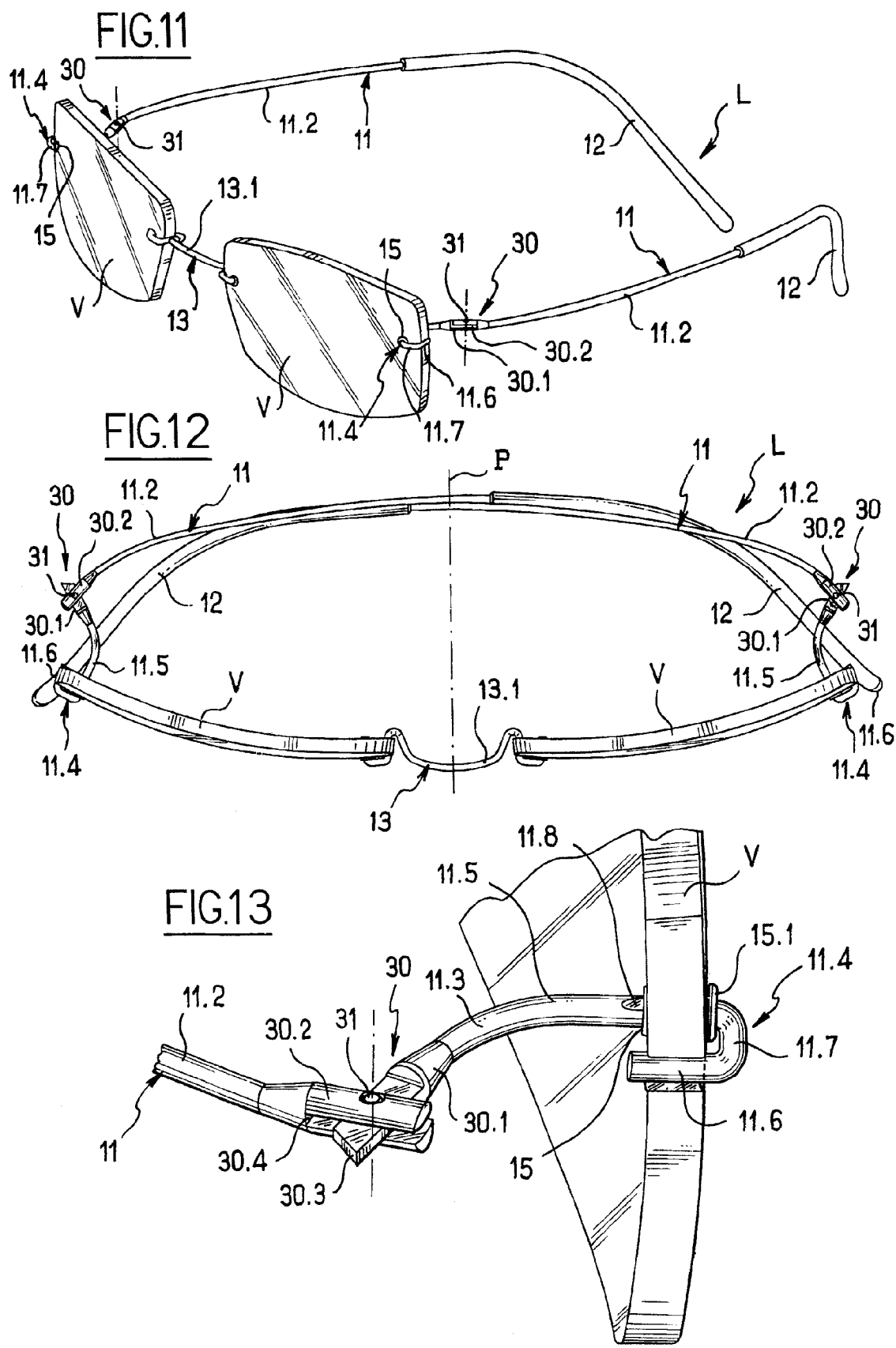

EYEGLASSES OF THE RIMLESS TYPE WITH WIRE BRANCHES

CROSS REFERENCE TO RELATED APPLICATION

Applicant hereby claims foreign priority benefits under U.S.C. §119 from French Patent Application No. 07 07531 filed on Oct. 26, 2007, the contents of which are incorporated by reference herein.

FIELD OF THE INVENTION

The present invention relates to the field of eyeglasses of the rimless type, comprising a bridge interconnecting two eyeglass lenses, and two side branches or "temples" connected to respective side zones of the corresponding lenses.

BACKGROUND OF THE INVENTION

So-called rimless eyeglasses, also known as pierced lens eyeglasses because of the holes formed through the thickness of the lenses in order to fasten the frames thereto, are becoming more and more widespread.

Reference can be made to the following documents: WO—2004/003632 A, EP—1 107 042 A, WO—96/05535 A, U.S. Pat. No. 6,447,117 A, WO—00/26716 A, EP—1 382 988 A, WO—03/014804 A, WO—02/095482 A, and WO—02/095481 A.

In most of the above-mentioned arrangements, in order to fasten each component element of the frame, i.e. the bridge and the two side branches, there is provided a through hole in the corresponding lens, together with an open side notch, or else two through holes are provided.

Document U.S. Pat. No. 5,835,183 A provides for hinge elements that are fastened to the side portions of the lenses via respective S-shaped parts, each having a free end passing through a through hole, with the central portion passing through an open side notch. The end portion, thus forming a loop, is designed to clamp resiliently onto the intermediate portion of the lens, where the clamping is further reinforced by elements seeking to increase friction resistance, in particular by means of teeth that bite into the surface of the corresponding lens from within the through hole and within the open side notch. Nevertheless, that presents the drawback of spoiling the surface of the lens, which surface is thus planed by the teeth, thereby weakening the zone of the lens that is clamped between the two portions of the clamp-forming branch, which zone is sometimes narrow.

Document JP—2002/318 372 A and EP—0 814 359 illustrate wire frames in which the branches, either including hinges or without hinges but suitable for deforming in bending, present hooked-shaped distal ends, with a terminal portion of each branch passing into an open side notch of the lens and with a short clamping portion passing into a hole in the lens, these two portions forming a clamp that presses against the portion of the lens that lies between the hole and the open side notch in order to ensure that the branch is held in place. Clamping of the lens is further reinforced in the arrangement of document JP—2002/318 372 A by the way the short portion is inclined towards the terminal portion of the branch, and by the corresponding inclination of the axis of the hole through the lens, possibly together with a bushing interposed in the notch so that its flange forms a spacer that prevents clamping being released.

Document WO—02/21193 A shows a variant of the above frames in which the side branches with hook-shaped distal ends are curved behind the lenses after they have been threaded through, and they are then held in place by respective folds adjacent to the rear faces of the lenses. Such a process is time-consuming and requires numerous operations that can only be performed manually.

Furthermore, proposals have been made to provide eyeglasses of the rimless type in which the side branches are deformable in bending without any hinge. For that purpose a forming technique is used that takes advantage of the shape memory capacities of certain metal alloys. In order to fasten hingeless and bendably-deformable branches of those types, it is general practice to engage pegs that pass through holes, as described for example in document WO—03/083553 A and U.S. Pat. No. 5,367,344 A.

In most circumstances, the fastener ends of the side branches present complex configurations with multiple bends, thereby implying a fabrication cost that is high. In addition, it is sometimes necessary to perform such bending in situ, after threading an end of the branch that is rectilinear and not yet bent through a hole in the lens, and that is particularly inconvenient for the operator.

More recently, eyeglasses of the rimless type have been proposed that have branches of hingeless and bendably-deformable wire structure, each side branch comprising a main portion and a distal end extending said main portion and arranged to fasten to the side zone of the lens, said distal end being generally J-shaped and including a holder portion passing through a through hole in the lens with a flexible clamping bushing being interposed there between that suffices on its own to hold the distal end in place, and an antirotation portion passing into an open side notch or into another through hole in the lens, without clamping the lens between said holder portion and said antirotation portion, the central portion that interconnects the holder portion and the antirotation portion extending in the vicinity of the front face of the lens, as taught in document U.S. Pat. No. 7,264,348 B2 of the Applicant.

The teaching of that document is to use side branches of hingeless and bendably-deformable wire structure so as to have a unitary wire component that can be put into place merely by being threaded through the lens from its front face, passing through the through hole, with the lack of any extra thickness making threading easy, in particular while passing through the flexible clamping bushing that is already put into place in the associated through hole.

SUMMARY OF THE INVENTION

The present invention seeks to propose eyeglasses of the rimless type that present very good performance, both in terms of simplicity of structure, and in convenience of assembly.

The problem is solved in accordance with the invention by eyeglasses of the rimless type comprising a bridge interconnecting two eyeglass lenses, and two side branches of wire structure each connected to a respective side zone of the corresponding lens, in which eyeglasses each side branch is fitted with a hinge that is arranged so that the section and the profile of the side branch in the deployed position are generally continuous so as to be capable of passing through the through hole in the lens, thereby enabling said side branch to be put into place merely by being threaded, while in its deployed position, through the lens from in front face.

Thus, by means of the invention, advantage is taken of the teaching of the above-mentioned document U.S. Pat. No. 7,264,348 B2 in an application to frames with hinged side branches.

In a particular embodiment, the hinge of each side branch is provided in the main portion of said branch.

In a first variant, the J-shaped distal end of each side branch comprises a long portion and a short portion respectively constituting the holder portion and the antirotation portion of said distal end, said long portion being connected to the main portion of the branch via a permanent bend forming an obtuse angle, and the hinge being provided at said permanent bend.

In another variant, the J-shaped distal end of each side branch comprises a long portion and a short portion respectively constituting the holder portion and the antirotation portion of said distal end, and the hinge is provided in the long portion of the J-shaped distal end.

Preferably, the hinge of each side branch is made by engaging two corresponding ends without the cross-section in the hinge presenting any increase relative to the wire segments that are on either side of said hinge.

In a variant, provision could be made for the hinge of each side branch to be made by engaging two corresponding ends of a segment that is of slightly greater thickness than the thickness of the wire segments on either side of said hinge. It is then advantageous to provide for the flexible clamping bushing that holds the distal end of each side branch in place to be split along a generator line so as to be capable of going past the hinge during preliminary threading of the bushing onto said branch while it is in its deployed position, prior to threading the side branch through the lens from its front face.

Other characteristics and advantages of the invention appear more clearly in the light of the following description given with reference to the figures of the accompanying drawings that show a preferred embodiment.

BRIEF DESCRIPTION OF THE DRAWINGS

Reference is made to the figures of the accompanying drawings, of which:

FIG. 1 is a perspective view of eyeglasses of the rimless type with hinged wire branches in accordance with the invention;

FIG. 2 is a plan view of the above-mentioned eyeglasses, in which view, the fastener ends of the side branches can be seen by transparency;

FIGS. 3 and 4 are fragmentary perspective views on a larger scale showing more clearly the fastener zone for a side branch in two variant embodiments;

FIG. 5 is a section on V-V of FIG. 3 showing in a) the shape of the hinge in the deployed position of the side branch, and in b) its shape when the same branch is in the folded position;

FIGS. 11 and 12 are a perspective view and a plan view of another variant in which a bushing of slightly greater thickness is provided at the hinge;

FIG. 13 is a detail view on a greatly enlarged scale showing the hinge of the frame of FIGS. 11 and 12.

DETAILED DESCRIPTION OF THE PREFERRED EMBODIMENT

Figure 6:
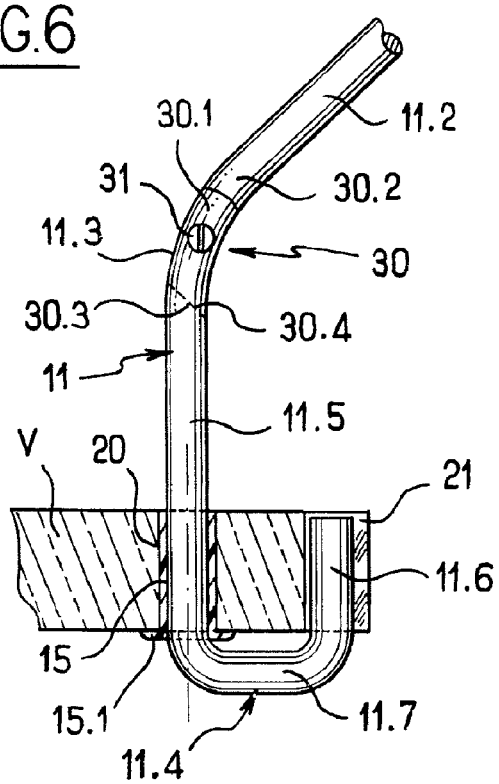
FIGS. 6 and 7 are views analogous to the view of FIG. 5 a), showing two variants in which the hinge is provided at different locations in the side branch.

As shown in FIGS. 1 and 2, the invention relates to eyeglasses of the rimless type. These glasses comprise two lenses V and a frame 10 of the wire type. The frame 10 comprises a bridge 13 interconnecting the two lenses V, and two side branches or "temples" of wire structure 11 that are connected to respective side zones of the corresponding lenses V, each branch being fitted with a respective hinge 30.

Specifically, the proximal ends 11.1 of the side branches 11 are provided with a covering element 12, such as a sleeve, or in a variant a ball or the like.

Each side branch 11 thus presents in succession a proximal end 11.1, here covered in a sleeve 12, then a main portion 11.2 that is slightly curved and that extends as far as a permanent bend 11.3 forming an obtuse angle. Beyond the bend 11.3 there is a distal end 11.4 that is arranged to be fastened to the side zone of the corresponding lens V.

This distal end 11.4 is generally J-shaped (seen from above or from below, depending on which branch is being observed), with a long holder portion 11.5 and a short antirotation portion 11.6, said portion being interconnected by a central portion 11.7.

The long holder portion 11.5 extends the main portion 11.2 of the branch and passes through a through hole 20 in the lens V with a flexible clamping bushing 15 being interposed that suffices to hold the distal end 11.4 in place, and the short antirotation portion 11.6 returns rearwards and passes either into an open side notch 21, as can be seen more clearly in the detail view of FIG. 3, or else in a variant into another through hole 24, as can be seen in the detail view of FIG. 4, and without clamping the lens between the long portion 11.5 and the short portion 11.6, the central portion 11.7 extending over the front face of the lens V.

The bridge 13, likewise of wire structure, is of conventional design, having a curved main portion 13.1, and fastener ends 13.4 on either side co-operating with respective holes 22 and open side notches 23 in the corresponding lenses so as to connect the bridge to both lenses of the eyeglasses. It can thus be seen that the fastener portion 13.4 of the bridge fastened to the corresponding lens zone merely by elasticity.

Provision could also be made for the ends of the bridge that pass through a through hole 22 to have a flexible clamping bushing interposed thereon analogous to the bushings 15 used for holding the side branches. Provision could also be made for a bridge of some other structure, in particular a bridge arranged to carry nose pads.

Specifically, it can be seen that the J-shaped distal end 11.4 of each side branch 11 lies in a plane that is substantially horizontal. This makes it possible to avoid any interfering twisting of the branch while it is being folded.

In addition, the long portion 11.5 of the distal end of each side branch 11 connects to the main portion 11.2 of the branch via a permanent bend 11.3 forming an obtuse angle. This long portion 11.5 extends from the rear face of the lens V, being rectilinear over a distance that is not less than the thickness of the glass. This facilitates subsequent disengagement, should that be necessary, in order to remove the side branch.

There also can be seen a flexible clamping bushing 15, shown in this example as having a collar 15.1 at one end that bears against a face of the corresponding lens V. In practice, and as explained below with reference to FIG. 10 or FIG. 14, each side branch 11 is mounted merely by being threaded through the lens from its front face, so that it is found preferable to place the flexible bushing 15 in such a manner that its collar 15.1 comes to bear against the front face of the lens. This makes it possible to provide a flexible clamping bushing 15 that is not expelled while the side branch is passing through the hole.

Specifically, the flexible clamping bushing 15 is a fitted part that is inserted in the corresponding hole in the lens. In a variant, provision could be made for the flexible clamping bushing 15 to be made in situ while the associated side branch 11 is in place, by molding or injecting a plastics material, e.g. silicone, into the corresponding hole in the lens.

It can be seen in FIG. 5, that the short portion 11.6, here received in the open side notch 21, does not clamp onto the corresponding portion of the lens by pinching it in the manner that frequently occurs in prior art arrangements. The short portion 11.6 serves here merely to provide an antirotation function, the branch being held in place solely by the long portion 11.5 which is locked in its flexible clamping bushing 15.

According to an essential characteristic of the invention, and as can be seen more clearly in FIG. 5, each side branch 11 is fitted with a hinge 30 that is arranged so that the section and the profile of the side branch remain generally continuous when the side branch is in its deployed position (position a) of FIG. 5) so as to enable it to pass through the through hole 20 in the lens V, thereby enabling the side branch 11 to be put into place merely by being threaded through from the front face of the lens, providing the branch is in its deployed position.

The hinge 30 interconnects two wire ends 30.1 and 30.2, with the ends being fastened together by a screw or a rivet 31 that also acts as a hinge pin. Specifically, the end 30.2 is in the form of a blade with a chamfered tip 30.3, while the end 30.1 is in the form of a fork with a sloping bottom 30.4 that acts as an abutment for the deployed position of the branch.

In position a) of FIG. 5, the profile and the section of the side branch 11 remain identical on going past the hinge 30, thereby enabling the branch to be threaded through the through hole 20 exactly as though the branch were deformable in bending without any hinge, and in particular with a flexible clamping bushing 15 that is already in place in the associated through hole 20.

In position b) in which the side branch 11 is folded, the shape is different and there are portions that project from the hinge 30.

FIG. 4 shows a variant in which the antirotation short portion 11.6 does not pass through an open side notch on returning rearwards, as in the above example, but instead passes into another through hole 34 in the lens. The disposition is otherwise identical to that described with reference to the above figures, and the same hinge 30 ensures continuity of the section and the profile of the side branch 11 when in the deployed position, so the explanatory views a) and b) of FIG. 5 remain valid.

Figure 7:
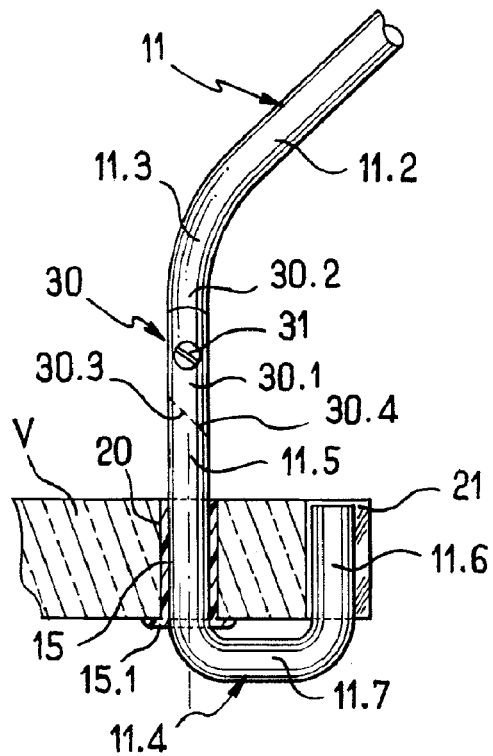

FIGS. 6 and 7 are similar to view a) of FIG. 5, and they show two other variants in which the hinge 30 is no longer provided in the main portion 11.2 of the side branch 11 (as it is in the preceding figures), but is provided either in the permanent bend 11.3 forming an obtuse angle (FIG. 6), or else in the long portion 11.6 of the J-shaped distal end 11.4 (FIG. 7).

Once more, there is continuity in the section and profile of the side branch 11 when it is in its deployed position (shown in FIGS. 6 and 7).

Thus, under all circumstances, each side branch 11 comprises a main portion 11.2 and a distal end having a long portion 11.5 shaped in terms of section and profile to be capable of passing through the through hole 20 in the lens V so as to enable said side branch to be put into place merely by being threaded through the lens from its front face, with this being possible in spite of the presence of the hinge 30 since the way it is arranged serves specifically to avoid any interference during such threading.

Figure 8:
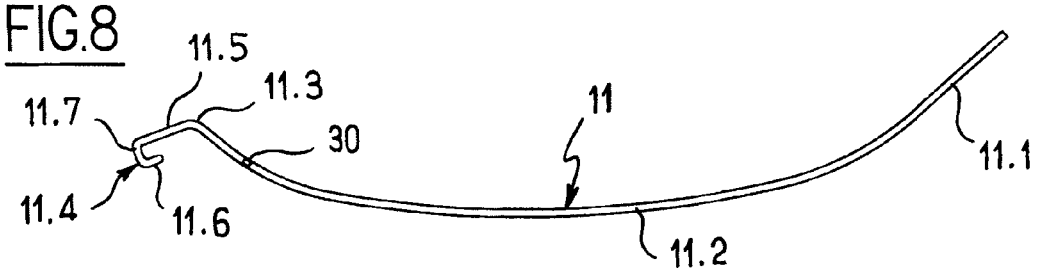
FIGS. 8 and 9 are respectively a plan view and a side view of a side branch having a proximal end that does not present any covering element such as a sleeve or a ball, this situation corresponding to initial mounting of the side branch.
Figure 9:
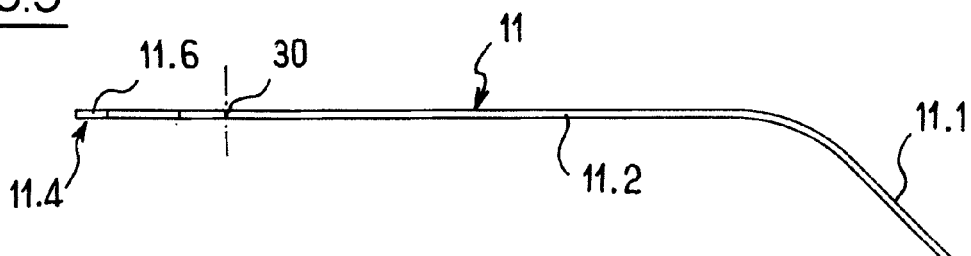

FIGS. 8 and 9 show more clearly the shape of a side branch 11, and it can be seen that its proximal end 11.1 is not covered in a sleeve or the like. The side branch 11 is preferably made of a metal wire, in particular a wire of surgical stainless steel, having a round section that is optionally locally flattened in a vertical direction in the vicinity of its main portion 11.2 so as to increase the flexibility of said branch in the directions in which it is folded.

Figure 10:
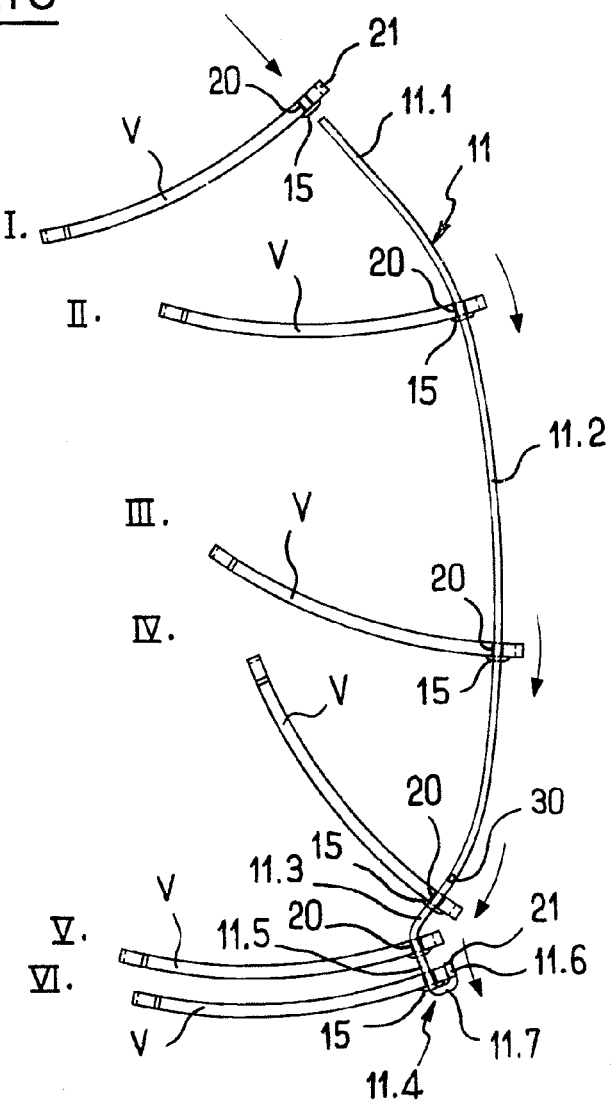
FIG. 10 is a diagrammatic view showing the various relative positions between the above-mentioned side branch and the corresponding lens as the branch is threaded through from the front face of the lens, without the hinge giving rise to any interference.

FIG. 10 shows the process whereby a side branch is put into place manually merely by being threaded through the corresponding lens V from its front face.

This figure shows the various relative positions of the lens and the side branch.

In position 1, the tip of the proximal end 11.1 of the branch 11 faces the through hole 20, which is already fitted with its flexible clamping bushing 15 so as to be ready for threading.

Positions II, III, IV, and V correspond to successive threading positions during which progressively longer fractions of the wire branch have passed through the through hole 20 fitted with its flexible bushing 15, including passage of the hinge 30 therethrough, until the lens reaches the distal fastener end 11.4 of said branch. The last stage of this movement, for reaching the final position VI, comprises sliding in a rectilinear direction only, thereby bringing the short portion 11.6 into the open side notch 21 of the lens.

It can thus be seen that the side branch 11 can be mounted quickly and easily, and without requiring the help of any tool, while retaining the advantage of being compact when the side branches in the folded position, which is a result of having suitably arranged hinges.

If it is subsequently desired to dismantle the assembly, it suffices to proceed in the opposite manner, thereby enabling the side branch to be changed while retaining the same lens, or vice versa.

As mentioned above, the flexible clamping bushing 15, regardless of whether it is constituted by a fitting or is made in situ by molding or injecting into the hole in the lens, suffices on its own to hold the distal fastener end 11.4 in place, it is possible for example to use a flexible material such as polyamide 6 or silicone, these materials also being transparent, thereby them more discreet.

FIGS. 11 to 13 show another variant in which, in the deployed position of the side branch, the section and the profile thereof are not completely continuous in the vicinity of the hinge 30, but nevertheless remain generally continuous so that it is still possible to thread the branch through the through hole 20 in the lens V. In FIG. 13, there can be seen the presence of a locally flattened zone 11.8 for the distal end 11.4, this zone forming a local projection that enhances fastening of the end portion of the branch in its holder bushing 15.

Thus, in this variant, the hinge 30 in each side branch 11 is no longer made by mutually engaging two corresponding ends 30.1 and 30.2 without any increase in cross-section compared with the wire segments on either side of the hinge, but rather by mutually engaging two corresponding ends 30'.1 and 30'.2 of a segment of thickness slightly greater than that of said wire segments. The hinge is preferably held in place by a rivet 31 rather than a screw. By way of indication, the segment of extra thickness constituting the hinge 30 may have a diameter of 1.7 millimeters (mm), which should be compared with the wire having a diameter of one millimeter.

Figure 14:
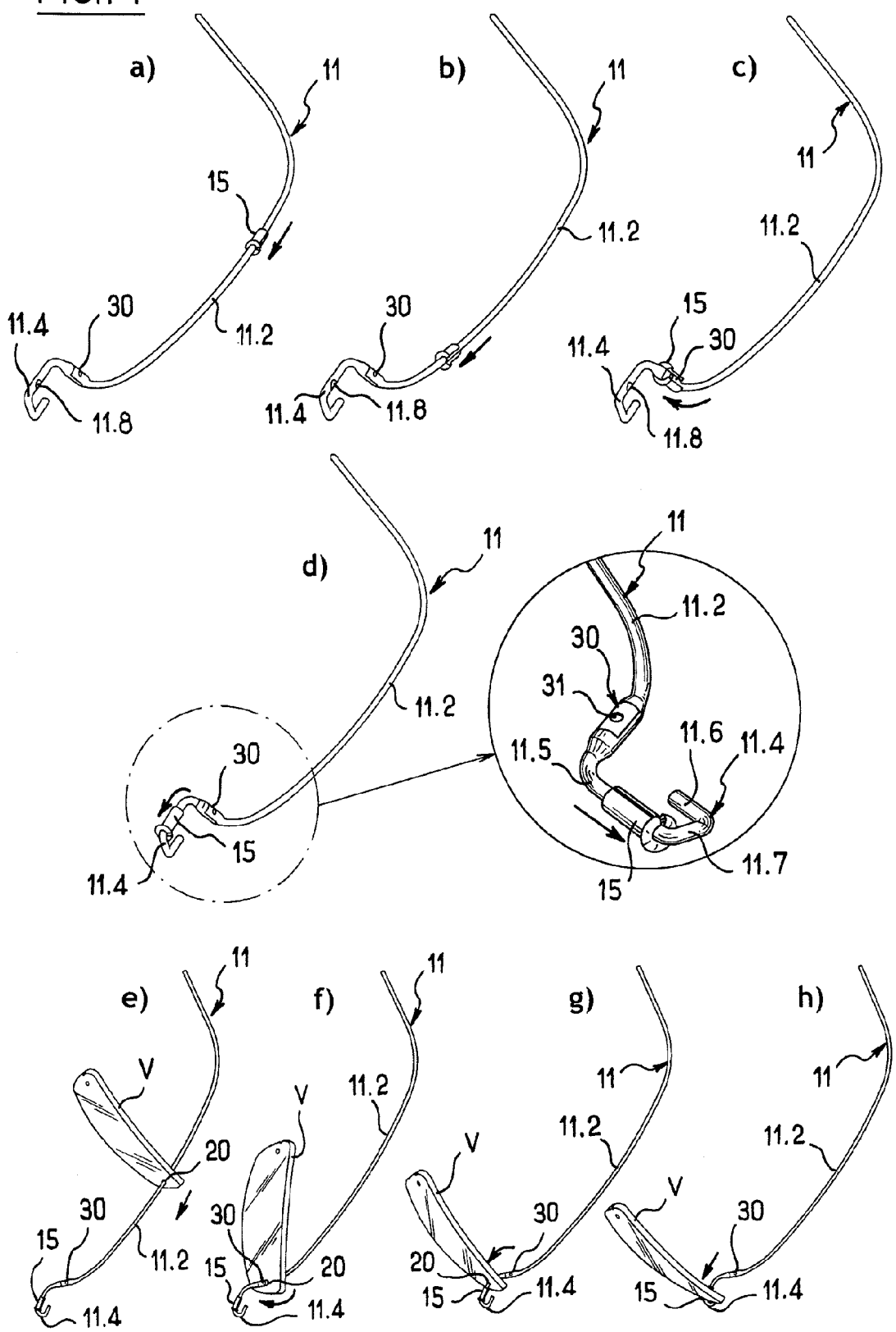
FIG. 14 is a diagrammatic view showing the various successive steps a) to h) in putting the branch into place, with the flexible clamping bushing initially being engaged on the branch, and then with the branch fitted therewith being threaded to pass through the through hole in the lens.

If the flexible clamping bushing 15 is in place in the associated through hole 20, then this slightly greater thickness will generally prevent the side branch being threaded so that the hinge passes through the lens. Provision is then made for the flexible bushing 15 to be prethreaded along the branch and positioned at the end of the branch in the vicinity of the central portion 11.7, so as to become inserted in the through hole 20 after the hinge 30 has passed therethrough. In order to enable the flexible bushing 15 to go past the hinge 20 without being damaged, it is preferable for the bushing to be split along a generator line, as shown in FIG. 14. It is also possible to provide for the head of the rivet to be die-stamped so as to ensure that the assembled hinge is perfectly cylindrical.

FIG. 14 thus shows the preliminary threading of the flexible bushing 15 onto the side branch 11 (steps a) to d)), with d) being associated with a detail on a larger scale showing the split bushing more clearly, after which the side branch 11 fitted in this way with its flexible bushing 15 is threaded through the through hole 20 in the lens V (steps e) to h)).

The invention is not limited to the embodiment described above, but on the contrary covers any variant using equivalent means to reproduce the essential characteristics specified above.

While the present invention has been illustrated and described with respect to a particular embodiment thereof, it should be appreciated by those of ordinary skill in the art that various modifications to this invention may be made without departing from the spirit and scope of the present invention.

What is claimed is:

1. Eyeglasses of the rimless type comprising a bridge interconnecting two eyeglass lenses, and two side branches of wire structure each connected to a respective side zone of the corresponding lens, each side branch comprising a main portion and a distal end extending said main portion and arranged to fasten to the side zone of the lens, said distal end being generally J-shaped and including a holder portion passing through a through hole in the lens with a flexible clamping bushing being interposed therebetween that suffices on its own to hold the distal end in place, and an antirotation portion passing into an open side notch or into another through hole in the lens, without clamping the lens between said holder portion and said antirotation portion, a central portion that interconnects the holder portion and the antirotation portion extending in the vicinity of the front face of the lens, wherein each side branch is fitted with a hinge that is arranged so that a section and a profile of the side branch in the deployed position are generally continuous so as to be capable of passing through the through hole in the lens, thereby enabling said side branch to be put into place merely by being threaded, while in its deployed position, through the lens from its front face.

2. The eyeglasses according to claim 1, wherein the hinge of each side branch is provided in the main portion of said branch.

3. The eyeglasses according to claim 1, wherein the J-shaped distal end of each side branch comprises a long portion and a short portion respectively constituting the holder portion and the antirotation portion of said distal end, said long portion being connected to the main portion of the branch via a permanent bend forming an obtuse angle, and the hinge being provided at said permanent bend.

4. The eyeglasses according to claim 1, wherein the J-shaped distal end of each side branch comprises a long portion and a short portion respectively constituting the holder portion and the antirotation portion of said distal end, and the hinge is provided in the long portion of the J-shaped distal end.

5. The eyeglasses according to claim 1, wherein the hinge of each side branch is made by engaging two corresponding ends without the cross-section in the hinge presenting any increase relative to the wire segments that are on either side of said hinge.

6. The eyeglasses according to claim 1, wherein the hinge of each side branch is made by engaging two corresponding ends of a segment that is of slightly greater thickness than the thickness of the wire segments on either side of said hinge.

7. The eyeglasses according to claim 6, wherein the flexible clamping bushing that holds the distal end of each side branch in place is split along a generator line so as to be capable of going past the hinge during preliminary threading of the bushing onto said branch while it is in its deployed position, prior to threading the side branch through the lens from its front face.

8. Eyeglasses of the rimless type comprising:
two eyeglass lenses, each lens having a front face and a side zone having a through hole and a side notch;
a bridge interconnecting the two eyeglass lenses; and
two side branches of wire structure, each including a main portion and a shaped distal end having a holder portion, a central portion, and an antirotation portion,
wherein the holder portion of the J-shaped distal end passes through the through hole and a flexible clamping bushing is interposed between the holder portion and the through hole,
wherein the antirotation portion of the J-shaped distal end passes through the side notch,
wherein the central portion of the J-shaped distal end extends along the front face of the lens,
wherein each side branch is fitted with a hinge,
wherein a cross-section and side profile of the hinge is substantially the same as a cross-section and side profile of the main portion of the side branch, and
wherein the side branch and binge are continuous and may be threaded through the through hole from the front face of the lens.

* * * * *